(12) United States Patent
Olson et al.

(10) Patent No.: US 6,216,999 B1
(45) Date of Patent: Apr. 17, 2001

(54) FLOATING MOUNT AND METHOD FOR MOUNTING A DEVICE TO A CHASSIS THEREBY

(75) Inventors: Robert Norman Olson, Mountain View; David V. Hoenig, Los Gatos; Christopher J. Novak, San Jose; Glen T. Walters, Moorpark, all of CA (US); Brian Thomas Sudderth, Leonard, TX (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/187,500

(22) Filed: Nov. 5, 1998

(51) Int. Cl.[7] ........................................................ G06F 1/16
(52) U.S. Cl. .......................... 248/694; 361/685; 361/683
(58) Field of Search ....................................... 248/694, 382, 248/672; 361/683, 728, 725, 727, 685; 312/223.1

(56) References Cited

U.S. PATENT DOCUMENTS

| | | | |
|---|---|---|---|
| 5,124,887 | * 6/1992 | Kobayashi | 361/683 |
| 5,397,462 | * 3/1995 | Higashijima et al. | 210/136 |
| 5,548,480 | * 8/1996 | Rudi et al. | 361/685 |
| 5,712,761 | * 1/1998 | Dials et al. | 361/685 |
| 5,748,453 | * 5/1998 | Carney et al. | 361/683 |
| 5,995,365 | * 11/1999 | Broder et al. | 361/685 |
| 5,999,416 | * 12/1999 | McAnally et al. | 361/816 |
| 6,053,586 | * 4/2000 | Cook et al. | 312/223.2 |
| 6,056,280 | * 5/2000 | Dials et al. | 361/685 |

* cited by examiner

Primary Examiner—Ramon O. Ramirez
Assistant Examiner—Jon Szumny
(74) Attorney, Agent, or Firm—Henneman & Saunders; Larry E. Henneman, Jr.

(57) ABSTRACT

A floating mount for attaching a device to a chassis, and for facilitating alignment of the device with respect to another structure fixed relative to the chassis. The floating mount includes a biasing member fixed to the chassis and a carrier adapted to mount to the device. The carrier includes an engaging portion for engaging the biasing member and receiving a retaining force exerted by the biasing member. The carrier also includes an aligning surface for abutting the other structure and for receiving an aligning force sufficient to overcome the retaining force and displace the carrier and the device into proper alignment with the other structure.

27 Claims, 5 Drawing Sheets

FIG. 6 ly to provide a thorough understanding of the present invention. Those skilled in the art will recognize, however, that the present invention may be practiced without these specific details or by using alternate elements or processes. In other instances well known processes, procedures, components, and circuits have not been described in detail so as not to unnecessarily obscure aspects of the present invention.

FLOATING MOUNT AND METHOD FOR MOUNTING A DEVICE TO A CHASSIS THEREBY

BACKGROUND OF THE INVENTION

1. Field of the Invention

This invention relates generally to mechanical mounting structures, and more particularly to a floating mount for attaching a device to a chassis, and for facilitating the alignment of the device with another structure fixed with respect to the chassis.

2. Description of the Background Art

In modern manufacturing processes, products are typically manufactured of individual components which must be assembled into a final product. For example, a television set includes a cathode ray tube (CRT), speakers, electronic circuits, and user controls. These components are mounted to one or more sub-chassis, which are then interconnected and enclosed in a housing. For both aesthetic and functional reasons, the CRT, the speakers, and the user controls must be properly aligned with associated openings in the housing.

Because mechanical tolerances are cumulative, the problem of aligning the various components with the housing is exacerbated as the number of sub-chassis increases. For example, if the user controls are mounted to a first sub-chassis with a tolerance of ±0.5 mm, then the first sub-chassis is mounted to a main chassis (e.g., with the rest of the electronic circuits) with a tolerance of ±0.5 mm, and then the main chassis is mounted in the housing with a tolerance of ±0.5 mm, the result is that the tolerance between the user controls and the housing through which they protrude adds to ±1.5 mm.

Such cumulative tolerances often preclude otherwise desirable and advantageous assembly processes. What is needed is a mount for attaching a device (e.g., user controls) to a chassis which facilitates easy alignment of the device with respect to another structure (e.g., an external housing) mounted to the chassis.

SUMMARY

The present invention overcomes the problems of the prior art by providing a floating mount for attaching a device (e.g., a CD ROM drive) to a chassis, and for facilitating the alignment of the device with respect to another structure (e.g., a housing bezel). The floating mount includes a biasing member (e.g., a spring) fixed to the chassis, and a carrier to which the device is mounted.

The carrier includes an engaging portion for engaging the biasing member, and an aligning surface for abutting a complementary aligning surface of the other structure. The biasing member exerts a retaining force on the carrier, urging the carrier in the direction of the other structure. When the chassis is fixed with respect to the other structure, the other structure exerts an aligning force on the carrier. The aligning force is sufficient to overcome the retaining force, and displaces the carrier and the mounted device into proper alignment along a first direction with the other structure. Optionally, the aligning surface of the carrier plate includes a non-planar surface (e.g., a tapered aperture), which cooperates with an associated surface (e.g., a cruciform projection) of the other structure to align the device with the other structure, along a second direction and along a third direction.

In a particular embodiment, the carrier includes a retainer (e.g., a hook), and the chassis includes a complementary retainer (e.g., a slot). Together, the retainer and the complementary retainer hold the carrier in the chassis.

In another particular embodiment, the floating mount includes a support member (e.g., a leaf spring) disposed to transfer at least a portion of the weight of said device to said chassis.

A method for assembling a system is also disclosed. The method includes providing a chassis with a biasing member and a retainer; providing a carrier with an engaging portion and a complementary retainer; mounting a device to the carrier; positioning the carrier into the chassis such that the engaging portion engages the biasing member; aligning the retainer of the chassis with the complementary retainer of the carrier; and releasing the carrier such that the biasing member displaces the carrier, moving the retainer into engagement with the complementary retainer. In a more particular method, the carrier includes an aligning surface, and the method further includes mounting the chassis to another structure with a complementary aligning surface, so that the complementary aligning surface engages the aligning surface, moving the carrier into proper alignment with the other structure.

BRIEF DESCRIPTION OF THE DRAWINGS

The present invention is described with reference to the following drawings, wherein like reference numbers denote substantially similar elements.

DETAILED DESCRIPTION

This patent application is related to the following co-pending patent application, filed on even date herewith and assigned to a common assignee, which is incorporated herein by reference in its entirety:

MODULAR LOGIC BOARD CHASSIS FOR A DESKTOP COMPUTER, by David V. Hoenig; Christopher J. Novak; Robert N. Olson; Brian T. Sudderth; and Glen T. Walters.

The present invention overcomes the problems associated with the prior art, by providing a floating mount which facilitates the attachment of a device to a chassis and the easy alignment of the attached device with another structure fixed relative to the chassis. Specifically, the present invention describes a floating mount for attaching a device (e.g., a CD ROM drive) to a chassis and aligning the device with another structure (e.g., a housing of a monitor module) when the chassis is fixed with respect to the other structure (e.g., mounted in the monitor module).

In the following description, numerous specific details are set forth (e.g., particular embodiments of a biasing member, retainers, support members, and aligning surfaces) in order to provide a thorough understanding of the invention. Those skilled in the art will recognize, however, that the invention may be practiced apart from these specific details. In other instances, well known details of mechanical design and assembly have been omitted, so as not to unnecessarily obscure the present invention.

Figure 1:
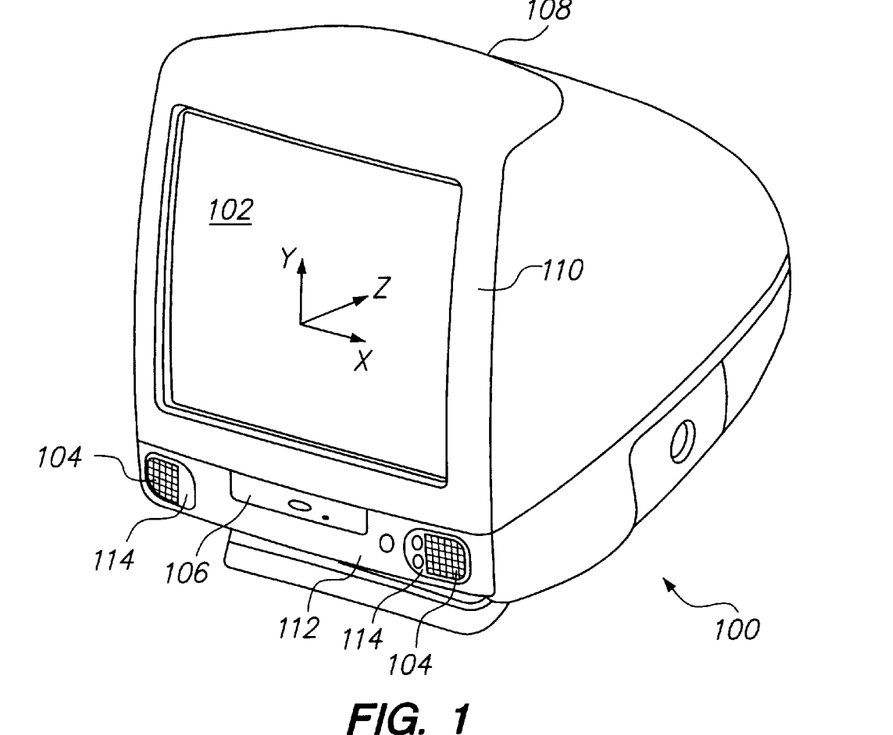
FIG. 1 is a perspective view of a computer system assembled in accordance with the present invention.

FIG. 1 is a perspective view of a computer system 100, which includes a floating mount (not visible in FIG. 1) according to the present invention. System 100 includes a cathode ray tube (CRT) 102., a pair of speakers 104, and a CD ROM drive 106, all at least partially enclosed a system housing 108. System housing 108 includes an upper bezel 110 and a lower bezel 112. CRT 102 is visible through upper bezel 110, and speakers 104 emit sound through a pair of speaker grilles 114. CD ROM drive 106 fits in and is accessible through an aperture defined between upper bezel 110 and lower bezel 112.

Figure 2:
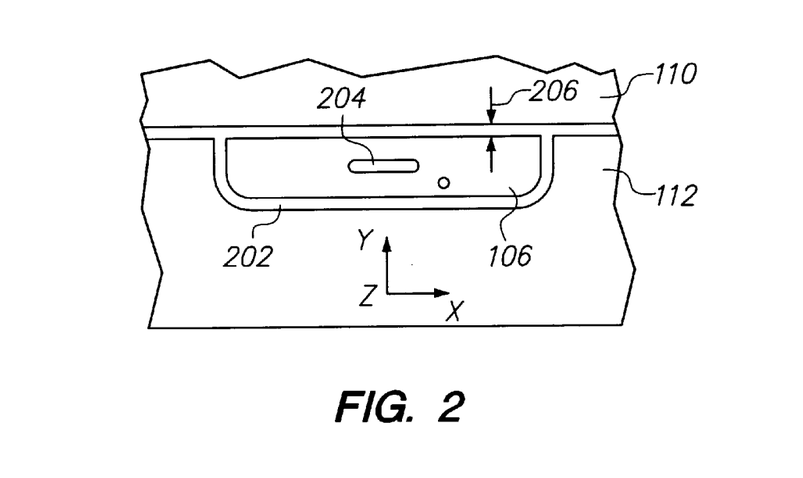
FIG. 2 shows a portion of the computer system of FIG. 1 in greater detail.

FIG. 2 shows the portion of upper bezel 110 and lower bezel 112 surrounding CD ROM drive 106 in greater detail. CD ROM drive is visible through aperture 202, which is defined on the top by upper bezel 110, and on the sides and bottom by lower bezel 112. CD ROM drive 106 is accessed by depressing an open/close button 204 on the face of drive 106, causing the tray of drive 106 to slide out toward the user through aperture 202.

For both aesthetic and functional reasons, it is desirable to minimize the gap 206 between the face of drive 106 and the edge of aperture 202. For example, an unnecessarily large gap 206 between drive 106 and aperture 202 would appear unsightly, and would increase the chances of dirt or other harmful foreign objects (e.g., coins, paper clips, etc.) getting inside of system 100. Minimizing gap 206, however, requires that the positioning tolerances between drive 106 and bezels 110 and 112 (i.e., along the X and Y directions) be extremely tight (e.g., ±0.5 mm). Otherwise, bezels 110 and 112 might interfere with the smooth opening and closing of drive 106. Additionally, it is desirable to maintain alignment between drive 106 and bezels 110 and 112 in the Z direction so that the face of drive 106 and bezels 110 and 112 appear as a smooth, continuous surface.

Figure 3:
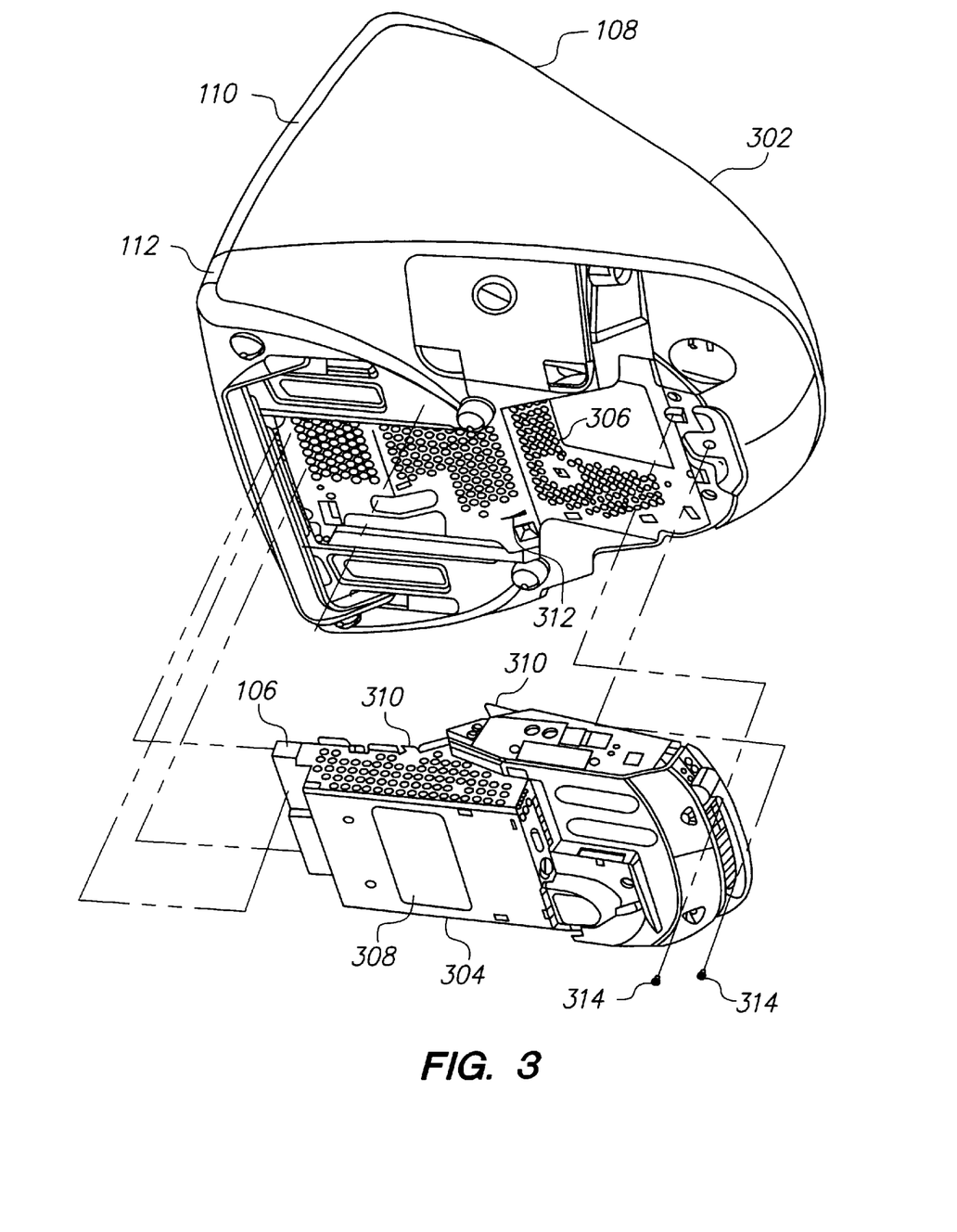
FIG. 3 is a partially exploded view showing the computer system of FIG. 1 to include a monitor module and a logic module.

FIG. 3 is a partially exploded view of system 100, shown to include a monitor module 302 and a separately assembled logic module 304. Monitor module 302 is constructed around a first chassis 306, and includes, among other components, speakers 104 (not visible in FIG. 3), 102 (not visible in FIG. 3), and system housing 108. Logic module 304 is constructed around a separate chassis 308, and includes CD ROM drive 106, as well as various other components including, but not limited to, a main computer board, drive controllers, and other mass storage devices (not visible in FIG. 3).

Those skilled in the art will understand that the particular components of each module 302 and 304 are not essential elements of the present invention. In fact, it is not even necessary that system 100 be constructed of separate modules to achieve some of the advantages of the present invention.

System 100 is assembled by mounting logic module 304 into monitor module 302. Logic module 304 includes a plurality of hooks 310 (not all visible in FIG. 3), which are designed to engage an associated plurality of slots 312 (not all visible in FIG. 3) in chassis 306. Once in place, a pair of retaining screws 314 prevents the disengagement of hooks 310 and slots 312. As logic module 304 is mounted to monitor module 302, CD ROM drive 106 is positioned in aperture 202 (FIG. 2), as will be discussed in greater detail below.

Figure 4:
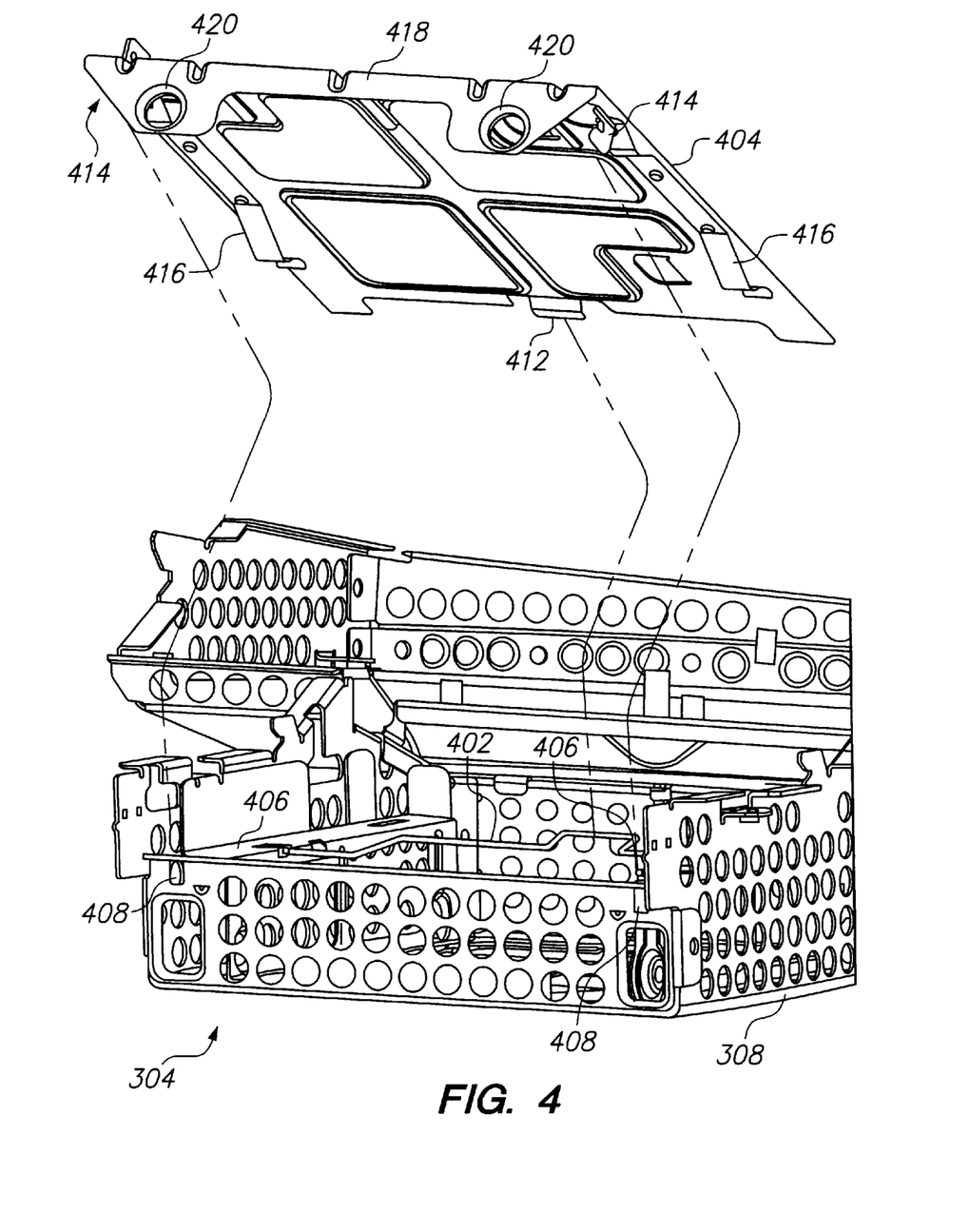
FIG. 4 is a perspective view of a portion of a chassis of the logic module of FIG. 3 and a detachable carrier plate.

FIG. 4 is a perspective view of a portion of chassis 308 including the floating mount of the present invention. The floating mount of the present invention includes a biasing member 402, fixed to chassis 308, and a carrier plate 404. Chassis 308 further includes supporting surfaces 406 and a pair of retaining slots 408.

In this particular embodiment, biasing member 402 is a wire spring, but those skilled in the art will understand that there are many other biasing members that may be substituted for wire spring 402, including but not limited to coil springs, hairpin springs, torsion springs, flat springs, constant force springs, foam springs, and other blocks of resilient material.

Carrier plate 404 includes an engaging portion 412, a pair of retaining hooks 414 (only one is visible in FIG. 4), a pair of leaf springs 416, and an aligning surface 418 including a pair of beveled apertures 420. Carrier plate 404 is also adapted to be mounted to CD ROM drive 106, as will be explained with reference to FIG. 5 below. Generally, drive 106 is attached to carrier plate 404 prior to installing carrier plate 404 into chassis 308. However, drive 106 is omitted from FIGS. 4–5, so as not to obscure other details of FIGS. 4–5.

Carrier plate 404 is installed in chassis 308 as follows. The installer positions carrier plate 404 in chassis 308 so that engaging portion 412 engages biasing member 402. Next, the installer exerts an inward force, moving carrier 404 in opposition to biasing member 402, until hooks 414 can be aligned with slots 408. Having been partially deformed by the inward movement of carrier plate 404, biasing member 402 now exerts a retaining force, via engaging portion 412, on carrier plate 404. As the installer relaxes the inward force, the retaining force applied by biasing member 402 urges carrier plate 404 forward, causing hooks 414 to engage and be retained in slots 408. Leaf springs 416 help support carrier plate 404 by transferring at least a portion of the weight of carrier plate 404 and drive 106 to support surfaces 406 of chassis 308. Thus, carrier plate 404 and attached CD ROM drive 106 are securely mounted to chassis 308, pending the mounting of logic module 304 to monitor module 302.

Those skilled in the art will recognize that each of hooks 414 and an associated one of slots 408 function together as a pair of complementary retainers, and that other retainer combinations, including but not limited to pin-aperture, hook-rod, surface-upward stop, and detent-receiver may be substituted for hooks 414 and slots 408. Additionally, the use of any particular type of retainers (e.g., hook-slot) or the use of a retainer at all, is not considered to be an essential element of the present invention. For example, the alignment advantages of the present invention (described below with reference to FIGS. 5–6) can be achieved in an embodiment where the retaining advantage is unnecessary (e.g., where the chassis, carrier, and device are immediately mounted in a housing), and the retainers can, therefore, be omitted.

Those skilled in the art will also recognize that leaf springs 416 and surfaces 406 function together as a support member, and that other support members, including but not limited to other types of springs, foam pads, and resting carrier plate 404 directly on surfaces 406, may be substituted for leaf springs 416 and surfaces 406.

Additionally, a support member is not considered to be an essential element of the present invention. For example, if biasing member 402 is of sufficient strength, then biasing member 402, together with hooks 414 and slots 408 may support the entire weight of carrier 404, such that no separate support member is required.

Figure 5:
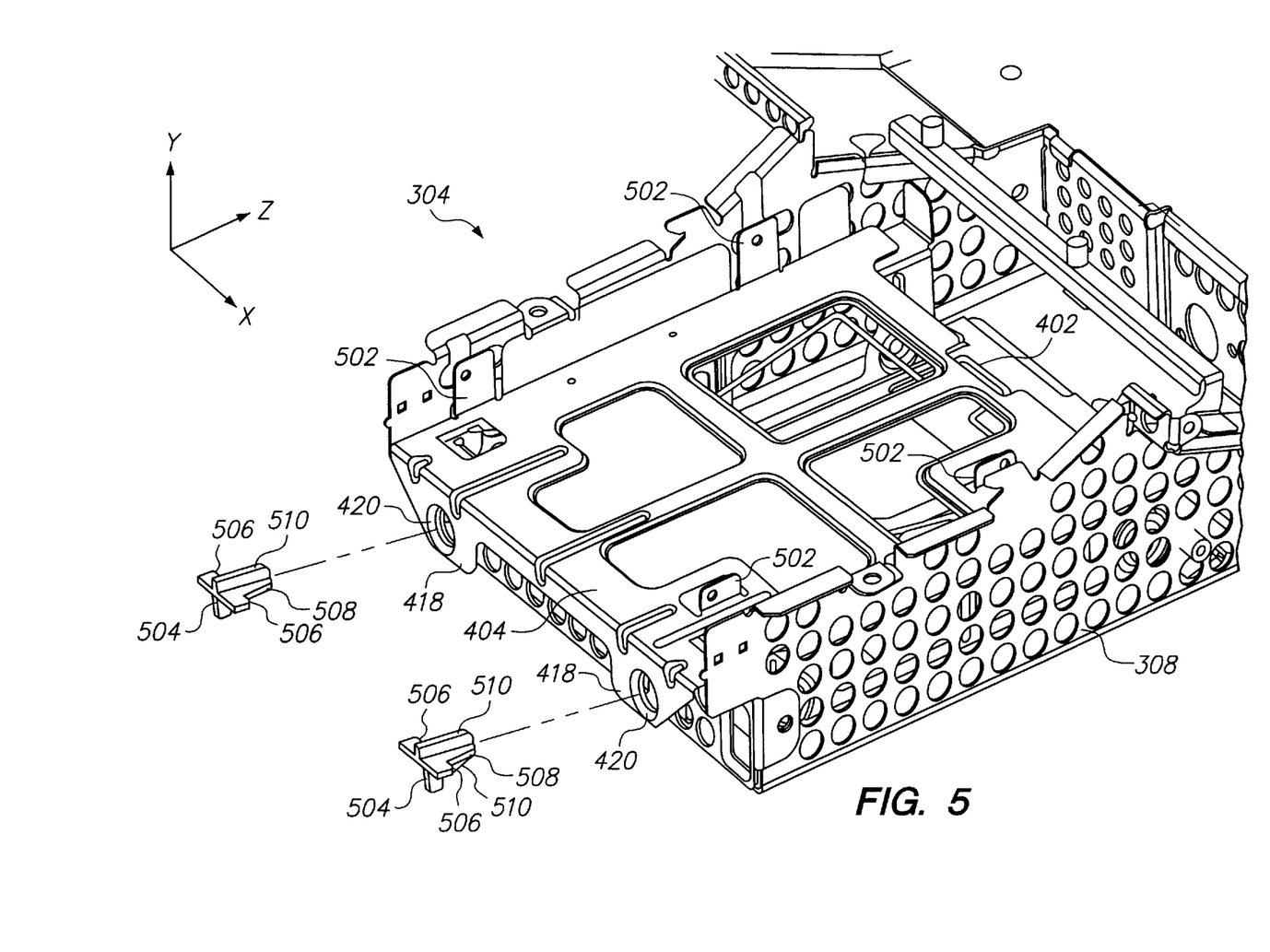
FIG. 5 is a perspective view of a portion of the chassis of FIG. 4 with the detachable carrier plate mounted thereon.

FIG. 5 is a perspective view of a portion of chassis 308, with carrier 404 seated therein. Carrier 404 includes a plurality of device mounting tabs 502 for mounting CD ROM drive 106 to carrier plate 404.

FIG. 5 also shows a pair of cruciform projections 504 which form a portion of a complementary aligning surface on the interior of lower bezel 112. The remainder of lower bezel 112 is omitted from FIG. 5 for clarity. Each of cruciform projections 504 includes a pair of depth (i.e., Z-direction) alignment surfaces 506, a pair of horizontal (i.e., X-direction) alignment surfaces 508, and a pair of vertical (i.e., Y-direction) alignment surfaces 510.

Cruciform projections 504 cooperate with beveled apertures 420 of aligning surface 418 to position carrier plate 404 (and attached CD ROM drive 106) in aperture 202 (FIG. 2). As logic module 304 is fixed monitor to module, 302, beveled apertures 420 slide over cruciform projections 504. Alignment surfaces 508 and 510 exert force on the beveled edges of apertures 420, urging carrier plate 404 into proper horizontal and vertical alignment, respectively, with lower bezel 112. Eventually, aligning surface 418 abuts alignment surface 506, correctly aligning the depth (i.e., Z-direction) of carrier plate 404 with respect to lower bezel 112. As chassis 308 is moved even closer to lower bezel 112, aligning surfaces 506 of cruciform projections 504 exert an aligning force on aligning surface 418 sufficient to overcome the retaining force exerted by biasing member 402, thereby moving carrier plate 404 with lower bezel 112 until logic module 304 is finally fixed in position with respect to monitor module 302. Once fixed in position, the retaining force exerted by biasing member 402 retains carrier plate in proper alignment with lower bezel 112. Note that the use of two aligning apertures 420, one on each side of carrier plate 404, also aligns the rotation of carrier plate 404 about the Z-axis.

A great variety of complementary aligning surfaces may be substituted for tapered apertures 420 and cruciform projections 504. For example, conical projections may be substituted for cruciform projections 504. Alternatively, a single pair of complementary aligning surfaces, for example a tapered triangular aperture and a pyramidal projection, can facilitate vertical, horizontal, depth, and rotational alignment of carrier plate 404. It is also not necessary for each of the aligning surfaces to be included in a single structure. For example, a surface with a vertical ridge may be used for horizontal and rotational alignment, a separate surface with a horizontal ridge may be used for vertical alignment, and yet another surface may be used for depth alignment. In such a case, each of the individual surfaces should be considered to form a portion of a single non-planar alignment surface.

Figure 6:
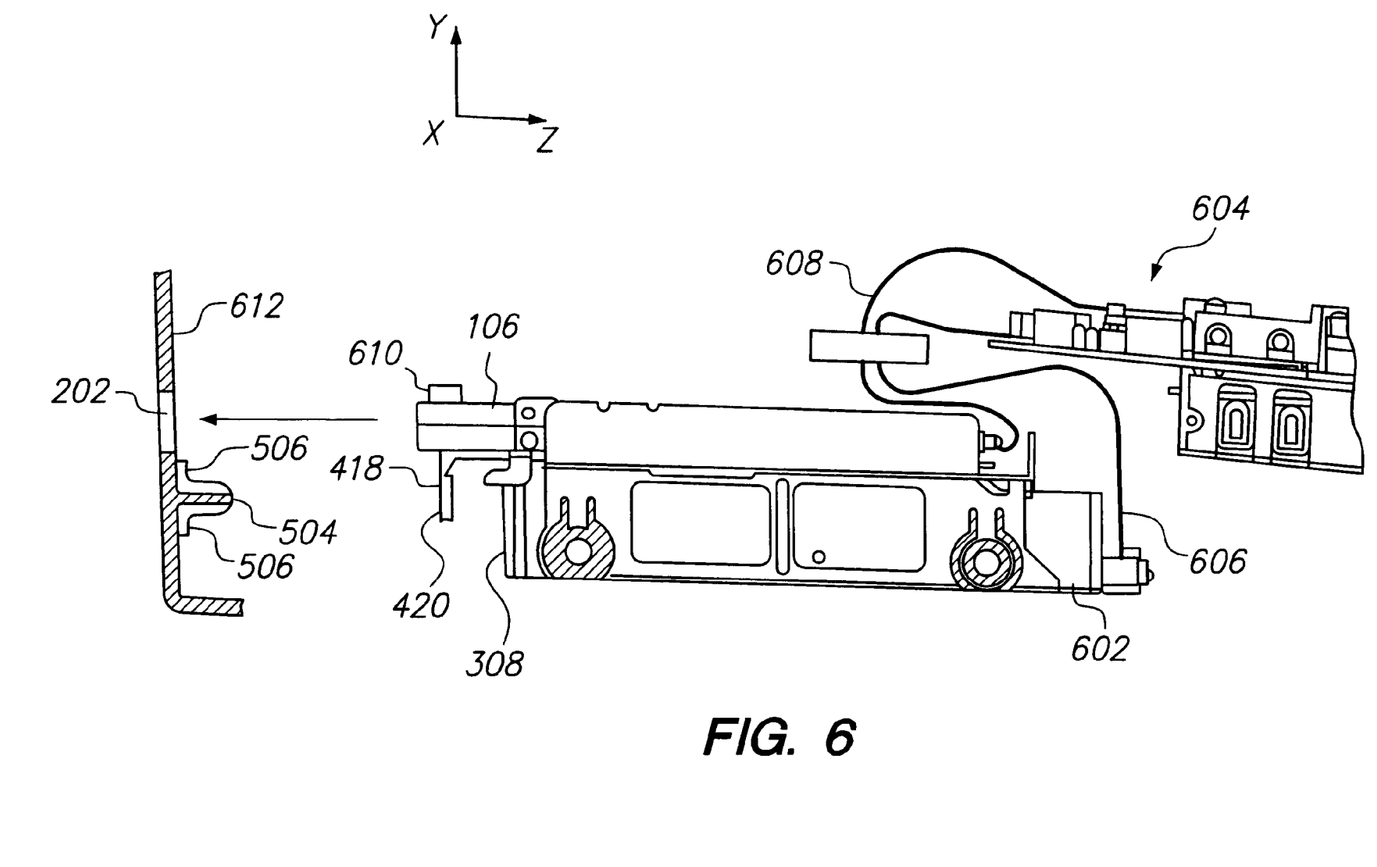
FIG. 6 is a diagrammatic side view of a portion of the chassis of FIG. 5 and an associated portion of the housing of the monitor module shown in FIG. 3.

FIG. 6 is a diagrammatic side view showing CD ROM drive 106 and carrier plate 404 mounted in chassis 308 of logic module 304. Chassis 308 also houses a hard drive 602 and a drive controller card 604. Hard drive 602 and CD ROM drive 106 are coupled to controller 604 via ribbon cables 606 and 608, respectively. CD ROM drive 106 includes an additional aligning surface 610 which abuts a complementary aligning surface 612 of lower bezel 112, to align the rotation of drive 106 with respect to the Y-axis and, in conjunction with aligning surfaces 418 and 506, with respect to the X-axis.

The disposition of aligning surface 610 on CD ROM drive 106 illustrates an important aspect of the present invention. Because carrier plate 404 and drive 106 are mounted to one another, several of the features of carrier plate 404 may be included in or fixed to the housing of drive 106, without departing from the scope of the present invention. For example, one or more of engaging portion 412, hooks 414, leaf spring 416, and aligning surfaces 418 and aligning apertures 420 may be embodied in the housing of drive 106. In such a case, it will be understood that carrier plate 404 includes the relevant portion of the housing of drive 106. In other words, the housing of drive 106 may be considered a portion of carrier plate 404.

The description of particular embodiments of the present invention is now complete. Many of the described features may be substituted, altered or omitted without departing from the scope of the invention. For example, the floating mount of the present invention may be used to mount devices other than CD ROM drives in a personal computer. Further, the use of the present invention is not limited to mounting devices in personal computers. Rather, the invention may be employed wherever it is desirable to maintain tight dimensional tolerances when assembling a system including multiple sub-components.

We claim:

1. A floating mount for attaching a device to a chassis, and for facilitating alignment of said device with respect to another structure subsequently fixed relative to said chassis, said floating mount comprising:

a biasing member adapted to engage said chassis; and a carrier adapted to mount to said device; said carrier including an engaging portion for engaging said biasing member and receiving a retaining force exerted by said biasing member, and an aligning surface for abutting said other structure and for receiving an aligning force sufficient to overcome said retaining force and displace said carrier and said device into proper alignment along a first direction with said other structure, said aligning force being generated by moving said other structure into position with respect to said chassis.

2. The floating mount according to claim 1, wherein said biasing member comprises a wire spring.

3. The floating mount according to claim 1, wherein:

one of said chassis and said carrier includes at least one retainer; and the other of said chassis and said carrier includes at least one complementary retainer, cooperative with said retainer for retaining said carrier in said chassis.

4. The floating mount according to claim 3, wherein said at least one retainer comprises a hook.

5. The floating mount according to claim 3, wherein said at least one complementary retainer comprises a slot.

6. The floating mount according to claim 1, wherein said aligning surface comprises a nonplanar surface formed to cooperate with a complementary surface of said other structure to align said device with said other structure along a second direction.

7. The floating mount according to claim 6, wherein said nonplanar surface is formed to cooperate with said complementary surface of said other structure to align said device with said other structure along a third direction.

8. The floating mount according to claim 7, wherein said first direction, said second direction, and said third direction are orthogonal to one another.

9. A floating mount according to claim 7, wherein:

one of said nonplanar surface and said associated surface comprises an aperture; and the other of said nonplanar surface and said associated surface comprises a cruciform projection.

10. The floating mount according to claim 6, wherein said aligning surface comprises a second nonplanar surface formed to cooperate with a second complementary surface of said other structure to align the angular position of said device with respect to said other structure.

11. The floating mount according to claim 10, wherein:
one of said nonplanar surface and said complementary surface comprises an aperture;
the other of said nonplanar surface and said complementary surface comprises a cone;
one of said second nonplanar surface and said second complementary surface comprises an aperture; and
the other of said second nonplanar surface and said second complementary surface comprises a cone.

12. The floating mount according to claim 6, wherein:
one of said chassis and said carrier includes at least one retainer; and
the other of said chassis and said carrier includes at least one complementary retainer, cooperative with said retainer for retaining said carrier in said chassis.

13. The floating mount according to claim 12, wherein said biasing member comprises a wire spring.

14. The floating mount according to claim 1, further comprising a support member disposed to transfer at least a portion of the weight of said device to said chassis.

15. The floating mount according to claim 14, wherein said support member comprises a leaf spring fixed to one of said carrier and said chassis.

16. The floating mount according to claim 14, wherein:
one of said chassis and said carrier includes at least one retainer; and
the other of said chassis and said carrier includes at least one complementary retainer, cooperative with said retainer for retaining said carrier in said chassis.

17. The floating mount according to claim 16, wherein said aligning portion includes a nonplanar surface adapted to cooperate with a complementary surface of said other structure to align said device with said other structure along a second direction.

18. The floating mount according to claim 14, wherein said aligning portion includes a nonplanar surface adapted to cooperate with a complementary surface of said other structure to align said device with said other structure along a second direction.

19. A floating mount chassis comprising:
a biasing member fixed to said chassis for engaging a carrier plate and exerting a retaining force on said carrier plate; and
a retainer adapted to receive a complementary retainer of said carrier plate, to retain said complementary retainer of said carrier plate under said retaining force, and to at least partially release said complementary retainer responsive to an aligning force subsequently applied to said carrier plate, said aligning force being exerted by another structure being subsequently mounted to said chassis.

20. The floating mount chassis according to claim 19, wherein said biasing member comprises a wire spring.

21. The floating mount chassis according to claim 19, wherein said retainer comprises a slot.

22. The floating mount chassis according to claim 19, further comprising a support member disposed to transfer at least a portion of the weight of said carrier plate to said chassis.

23. The floating mount chassis according to claim 22, wherein said support member comprises a surface adapted to engage a leaf spring fixed to said carrier.

24. The floating mount chassis according to claim 22, wherein said support member comprises a leaf spring fixed to said chassis.

25. A computer system comprising:
a chassis;
a housing adapted to be fixed to said chassis;
a biasing member; and
a carrier adapted to mount to a computer device, said carrier including an engaging portion for engaging said biasing member and receiving a retaining force exerted by said biasing member between said carrier and said chassis, and an aligning portion for abutting said housing and for receiving an aligning force exerted by said housing sufficient to overcome said retaining force and displace said carrier and said device into proper alignment along a first direction with said housing, as said housing is fixed to said chassis.

26. A method for assembling a system comprising:
providing a chassis including a biasing member and a retainer;
providing a carrier including an engaging portion, an aligning surface, and a complementary retainer;
mounting a device to said carrier;
positioning said carrier into said chassis such that said engaging portion of said carrier engages said biasing member;
displacing said carrier in opposition to said biasing member;
aligning said complementary retainer of said carrier with said retainer of said chassis;
releasing said carrier such that said biasing member displaces said carrier, moving said retainer into engagement with said complementary retainer; and
mounting another structure to said chassis, said other structure having a complementary aligning surface;
whereby, said complementary aligning surface exerts an aligning force on said aligning surface sufficient to displace said carrier in opposition to said biasing member and move said carrier into proper alignment with said other structure.

27. A floating mount for attaching a device to a chassis, and for facilitating alignment of said device with respect to another structure subsequently fixed relative to said chassis, said floating mount comprising.
biasing means for exerting a retaining force;
carrying means for attaching to said device and for receiving said retaining force; and
aligning means for abutting said other structure and for receiving an aligning force sufficient to overcome said retaining force and displace said carrying means and said device into proper alignment with said other structure as said other structure is fixed relative to said chassis.

* * * * *

UNITED STATES PATENT AND TRADEMARK OFFICE
CERTIFICATE OF CORRECTION

PATENT NO. : 6,216,999 B1
DATED : April 17, 2001
INVENTOR(S) : Olson et al.

Page 1 of 1

It is certified that error appears in the above-identified patent and that said Letters Patent is hereby corrected as shown below:

Column 7,
Line 52, delete ", said aligning force."

Signed and Sealed this

Twenty-sixth Day of February, 2002

Attest:

Attesting Officer

JAMES E. ROGAN
Director of the United States Patent and Trademark Office